(12) United States Patent
Fukuma et al.

(10) Patent No.: US 11,557,435 B2
(45) Date of Patent: Jan. 17, 2023

(54) MULTILAYER CERAMIC ELECTRONIC COMPONENT AND METHOD FOR MANUFACTURING THE SAME

(71) Applicant: Murata Manufacturing Co., Ltd., Nagaokakyo (JP)

(72) Inventors: Takashi Fukuma, Nagaokakyo (JP); Koji Moriyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 60 days.

(21) Appl. No.: 16/926,923

(22) Filed: Jul. 13, 2020

(65) Prior Publication Data

US 2021/0020378 A1    Jan. 21, 2021

(30) Foreign Application Priority Data

Jul. 17, 2019 (JP) .............................. JP2019-132137

(51) Int. Cl.
| | |
|---|---|
| *H01G 4/30* | (2006.01) |
| *H01G 4/12* | (2006.01) |
| *H01G 4/012* | (2006.01) |
| *H01G 4/248* | (2006.01) |

(52) U.S. Cl.
CPC ............... *H01G 4/30* (2013.01); *H01G 4/012* (2013.01); *H01G 4/12* (2013.01); *H01G 4/248* (2013.01)

(58) Field of Classification Search
CPC .......... H01G 4/30; H01G 4/248; H01G 4/012; H01G 4/232; H01G 4/008; H01G 4/12; H01G 4/005

USPC .... 361/321.1, 321.3, 301.4, 306.3, 311, 303, 361/321.2
See application file for complete search history.

(56) References Cited

U.S. PATENT DOCUMENTS

| | | | |
|---|---|---|---|
| 9,099,246 B1* | 8/2015 | Kitano | H01G 4/012 |
| 2006/0256504 A1* | 11/2006 | Kojima | H01G 4/30 |
| | | | 361/311 |
| 2012/0058257 A1* | 3/2012 | Takeuchi | H01G 4/2325 |
| | | | 427/123 |
| 2012/0127626 A1* | 5/2012 | Chang | H01G 4/012 |
| | | | 361/301.4 |
| 2012/0194031 A1* | 8/2012 | Ogawa | H01G 4/005 |
| | | | 310/311 |
| 2016/0233024 A1* | 8/2016 | Kim | H01G 4/30 |
| 2017/0250028 A1* | 8/2017 | Makino | H01G 4/005 |
| 2018/0301281 A1* | 10/2018 | Park | H01G 4/12 |
| 2019/0180938 A1* | 6/2019 | Tahara | H01G 4/012 |
| 2019/0221368 A1* | 7/2019 | Ono | H01G 4/012 |
| 2020/0066453 A1* | 2/2020 | Jeong | H01G 4/248 |

FOREIGN PATENT DOCUMENTS

JP       2001-210545 A       8/2001

* cited by examiner

*Primary Examiner* — Arun Ramaswamy
(74) *Attorney, Agent, or Firm* — Keating & Bennett, LLP (57) ABSTRACT

In a multilayer ceramic electronic component, a stacked body includes a first outer layer and a first outermost internal electrode layer. The first outer layer defines a first main surface. The first outermost internal electrode layer is adjacent to the first outer layer. The first outermost internal electrode layer is in contact with a first external electrode at a first end surface. The thickness of the first outer layer at the first end surface is greater than the thickness of the first outer layer at the center or approximate center in a length direction.

14 Claims, 7 Drawing Sheets

MULTILAYER CERAMIC ELECTRONIC COMPONENT AND METHOD FOR MANUFACTURING THE SAME

CROSS REFERENCE TO RELATED APPLICATIONS

This application claims the benefit of priority to Japanese Patent Application No. 2019-132137 filed on Jul. 17, 2019. The entire contents of this application are hereby incorporated herein by reference.

BACKGROUND OF THE INVENTION

1. Field of the Invention

The present invention relates to a multilayer ceramic electronic component and a method for manufacturing the same.

2. Description of the Background Art

Japanese Patent Laid-Open No. 2001-210545 discloses a configuration of a multilayer ceramic electronic component. The multilayer ceramic electronic component described in Japanese Patent Laid-Open No. 2001-210545 includes an electronic component body and first and second external electrodes. The electronic component body has dimensions of about 0.6 mm or less in the length direction, about 0.3 mm or less in the width direction, and about 0.3 mm or less in the thickness direction. The electronic component body has first and second end surfaces at both ends in the length direction. The first and second external electrodes have electrode cover portions. The electrode cover portions respectively cover the first and second end surfaces of the electronic component body and respectively extend from the first and second end surfaces to other surfaces adjacent thereto of the electronic component body. Each of the first and second external electrodes has a sintered metal layer and a Ni plating layer formed on the sintered metal layer.

In conventional multilayer ceramic electronic components, an underlying electrode layer in external electrodes is formed by dipping. Specifically, the underlying electrode layer is formed by immersing a stacked body in conductive paste while the stacked body is placed with its length direction being along the direction of gravity. The gravity causes the conductive paste on ridge lines of the stacked body to flow toward the center of an end surface of the stacked body. Also, the surface tension causes the conductive paste to gather on the main surfaces and the lateral surfaces of the stacked body. As a result, portions of external electrodes that are formed on the ridge lines are relatively thin.

In conventional multilayer ceramic electronic components, the ridge lines of a stacked body are rounded. Accordingly, among internal electrode layers, the outermost internal electrode layers are relatively close to the ridge lines. This causes water to easily enter the interfaces between the outermost internal electrode layers and the dielectric layers through the relatively thin portions of the external electrodes that are formed on the ridge lines.

SUMMARY OF THE INVENTION

Preferred embodiments of the present invention provide multilayer ceramic electronic components each having an improved resistance to moisture.

A multilayer ceramic electronic component according to a preferred embodiment of the present invention includes a stacked body, a first external electrode, and a second external electrode. The stacked body includes a plurality of dielectric layers and a plurality of internal electrode layers alternately stacked along the stacking direction. The stacked body includes first and second main surfaces, first and second lateral surfaces, and first and second end surfaces. The first and second main surfaces are opposite to each other in the stacking direction. The first and second lateral surfaces are opposite to each other in the width direction orthogonal or substantially orthogonal to the stacking direction. The first and second end surfaces are opposite to each other in the length direction orthogonal or substantially orthogonal to both the stacking direction and the width direction. The first external electrode covers the first end surface and continuously extends from the first end surface to each of the first main surface, the second main surface, the first lateral surface, and the second lateral surface. The second external electrode covers the second end surface and continuously extends from the second end surface to each of the first main surface, the second main surface, the first lateral surface, and the second lateral surface. The stacked body includes a first outer layer and a first outermost internal electrode layer. The first outer layer of the plurality of dielectric layers defines the first main surface. The first outermost internal electrode layer of the plurality of internal electrode layers is adjacent to the first outer layer. The first outermost internal electrode layer is in contact with the first external electrode at the first end surface. The thickness of the first outer layer at the first end surface is greater than the thickness of the first outer layer at the center or approximate center in the length direction.

A method for manufacturing a multilayer ceramic electronic component according to a preferred embodiment of the present invention includes forming a mother stacked body before compression, compressing, grinding, cutting, firing, polishing, and forming external electrodes. The forming of the mother stacked body before compression includes forming an inner layer portion, forming a first outer layer dielectric portion, and forming a first grinding target portion. In the forming of the inner layer portion, a plurality of dielectric sheets having internal-electrode conductive paste applied thereto are stacked. In the forming of the first outer layer dielectric portion, a plurality of dielectric sheets are further stacked on one side in a stacking direction of the inner layer portion. In the forming of the first grinding target portion, a plurality of dielectric sheets are further stacked on the one side in the stacking direction of the first outer layer dielectric portion. In the compressing, the mother stacked body before compression is pressed in the stacking direction. In the grinding, the first grinding target portion of the compressed mother stacked body is ground to form a planar first main surface. In the cutting, a stacked body is cut out of the mother stacked body including the first main surface and a second main surface opposite to the first main surface in the stacking direction. The stacked body includes first and second lateral surfaces and first and second end surfaces. The first and second lateral surfaces are opposite to each other in the width direction orthogonal or substantially orthogonal to the stacking direction. The first and second end surfaces are opposite to each other in the length direction orthogonal or substantially orthogonal to both the stacking direction and the width direction. In the firing, the stacked body is fired. In the polishing, a plurality of corners and a plurality of ridge lines of the stacked body are polished. In the forming of the external electrodes, a first external electrode and a second external electrode are formed. The first external electrode covers the first end surface and continuously extends from the first end surface to each of the first main surface, the second main surface, the first lateral surface, and the second lateral surface. The second external electrode covers the second end surface and continuously extends from the second end surface to each of the first main surface, the second main surface, the first lateral surface, and the second lateral surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components and methods for manufacturing the same according to preferred embodiments of the present invention will now be described with reference to the drawings. In the description of the preferred embodiments below, the same or corresponding portions in the drawings are designated by the same reference signs, and the description of such portions is not repeated.

Figure 1:
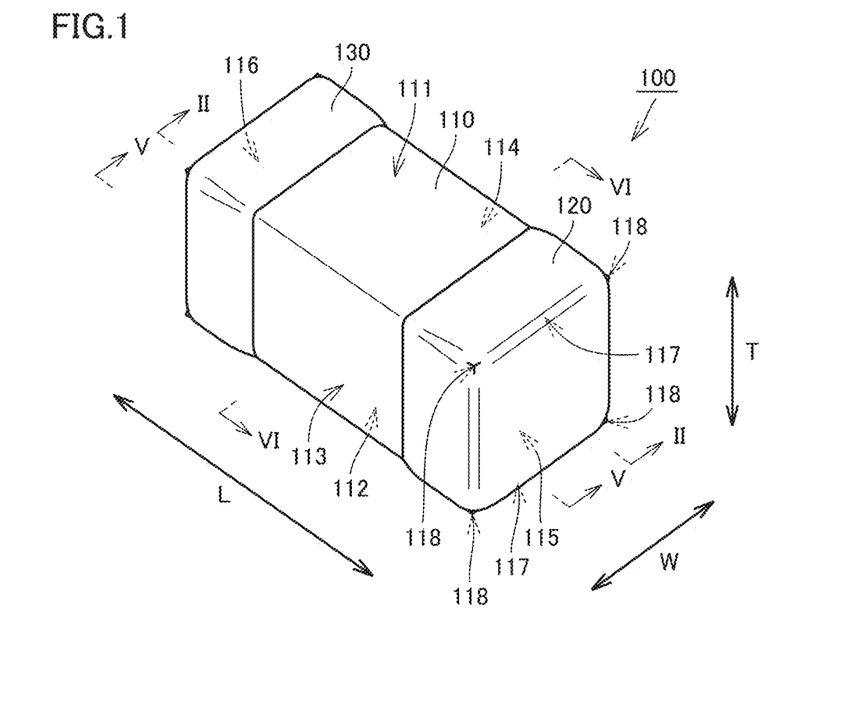
FIG. 1 is an outside perspective view of a multilayer ceramic electronic component according to a preferred embodiment of the present invention.
Figure 2:
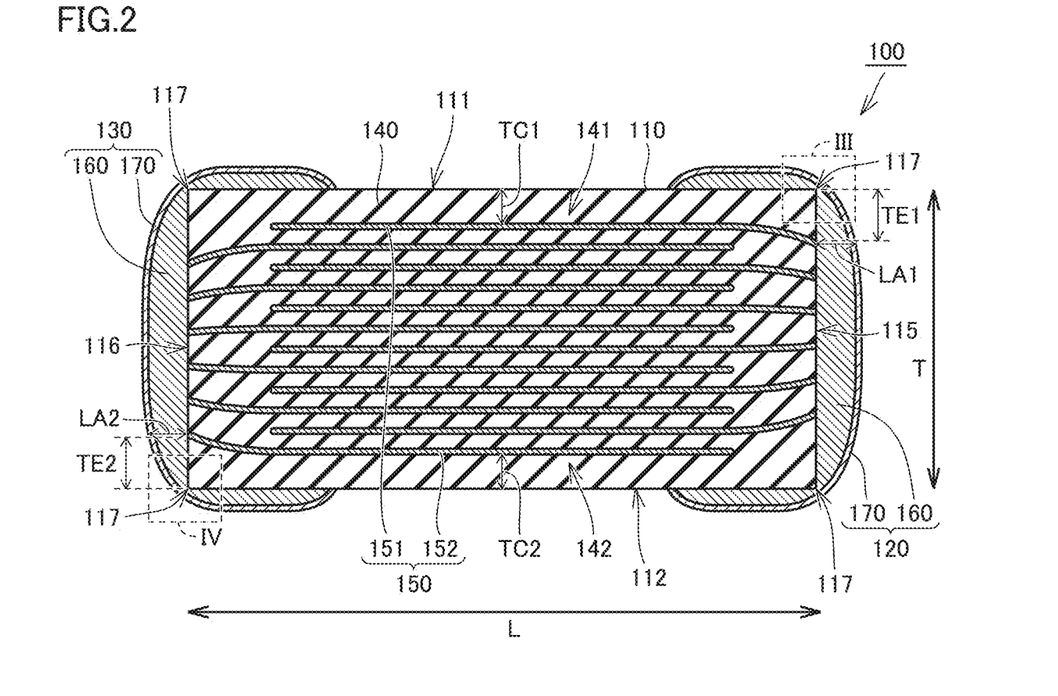
FIG. 2 is a cross-sectional view of the multilayer ceramic electronic component in FIG. 1, taken along arrows II-II.
Figure 3:
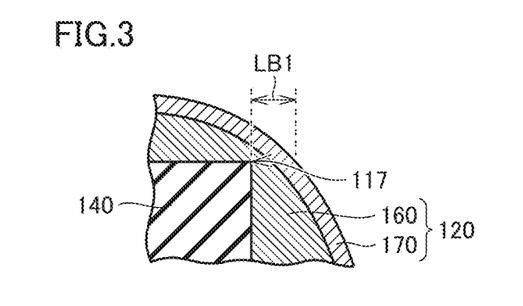
FIG. 3 is a partial enlarged cross-sectional view showing area III of the multilayer ceramic electronic component in FIG. 2.
Figure 4:
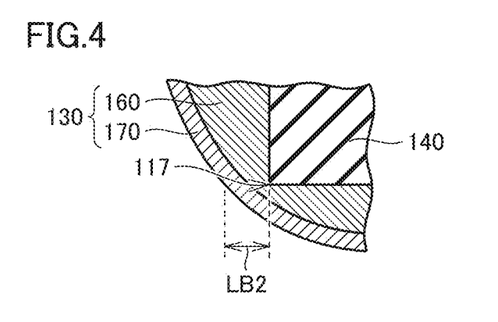
FIG. 4 is a partial enlarged cross-sectional view showing area IV of the multilayer ceramic electronic component in FIG. 2.
Figure 5:
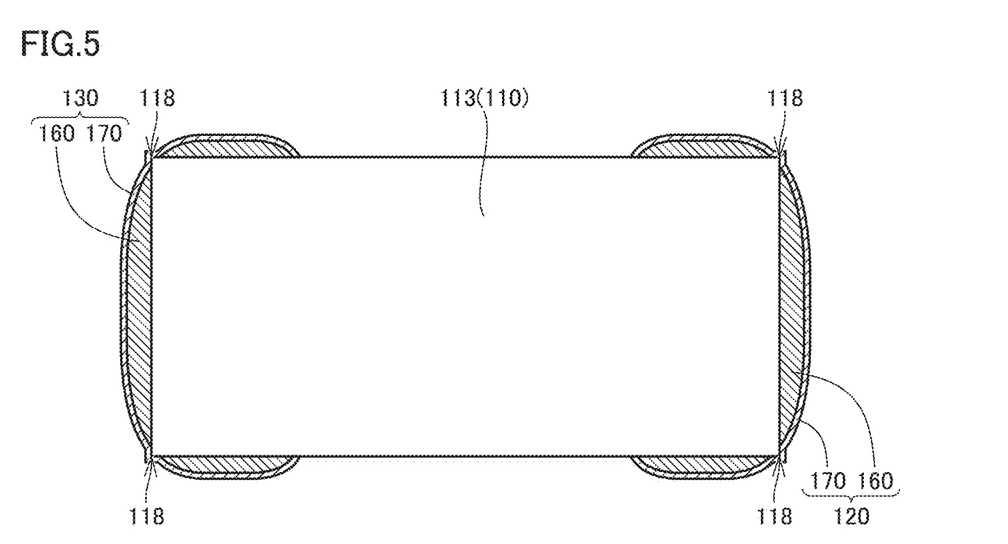
FIG. 5 is a cross-sectional view of the multilayer ceramic electronic component in FIG. 1, taken along arrows V-V.
Figure 6:
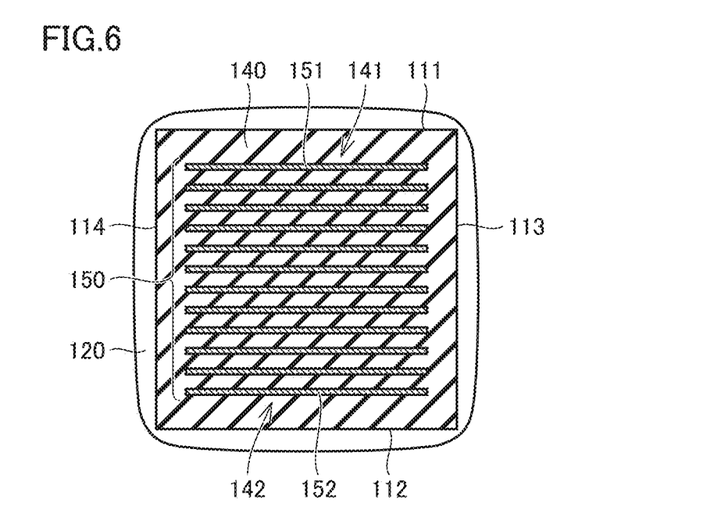
FIG. 6 is a cross-sectional view of the multilayer ceramic electronic component in FIG. 1, taken along arrows VI-VI.

FIG. 1 is an outside perspective view of a multilayer ceramic electronic component according to a preferred embodiment of the present invention. FIG. 2 is a cross-sectional view of the multilayer ceramic electronic component in FIG. 1, taken along arrows II-II. FIG. 3 is a partial enlarged cross-sectional view showing area III of the multilayer ceramic electronic component in FIG. 2. FIG. 4 is a partial enlarged cross-sectional view showing area IV of the multilayer ceramic electronic component in FIG. 2. FIG. 5 is a cross-sectional view of the multilayer ceramic electronic component in FIG. 1, taken along arrows V-V. FIG. 6 is a cross-sectional view of the multilayer ceramic electronic component in FIG. 1, taken along arrows VI-VI. FIG. 5 shows a cross section of external electrodes taken along the first lateral surface described later.

As shown in FIGS. 1 to 6, a multilayer ceramic electronic component 100 according to a preferred embodiment of the present invention includes a stacked body 110, a first external electrode 120, and a second external electrode 130. Stacked body 110 includes a plurality of dielectric layers 140 and a plurality of internal electrode layers 150 alternately stacked along stacking direction T.

Stacked body 110 includes a first main surface 111, a second main surface 112, a first lateral surface 113, a second lateral surface 114, a first end surface 115, and a second end surface 116.

First main surface 111 and second main surface 112 are opposite to each other in stacking direction T. First lateral surface 113 and second lateral surface 114 are opposite to each other in width direction W orthogonal or substantially orthogonal to stacking direction T. First end surface 115 and second end surface 116 are opposite to each other in length direction L orthogonal or substantially orthogonal to both stacking direction T and width direction W.

In the present preferred embodiment, stacked body 110 further includes a plurality of ridge lines 117 and a plurality of corners 118. As shown in FIG. 2, the plurality of ridge lines 117 include an intersection of first main surface 111 and first end surface 115, an intersection of first main surface 111 and second end surface 116, an intersection of second main surface 112 and first end surface 115, and an intersection of second main surface 112 and second end surface 116. As shown in FIG. 5, each of the plurality of corners 118 is an intersection of three planes of stacked body 110.

As shown in FIG. 1, stacked body 110 has a rectangular or substantially rectangular parallelepiped external shape. Stacked body 110 has a greater dimension in length direction L than in width direction W. Stacked body 110 has a greater dimension in length direction L than in stacking direction T. In the present preferred embodiment, stacked body 110 has equal or substantially equal dimensions in width direction W and stacking direction T. However, stacked body 110 may have different dimensions in width direction W and stacking direction T. Note that the dimensions being equal or substantially equal may include dimensions having a difference within a range of about 5%, for example.

As shown in FIGS. 1 and 2, first external electrode 120 covers first end surface 115 and continuously extends from first end surface 115 to each of first main surface 111, second main surface 112, first lateral surface 113, and second lateral surface 114. Second external electrode 130 covers second end surface 116 and continuously extends from second end surface 116 to each of first main surface 111, second main surface 112, first lateral surface 113, and second lateral surface 114.

On first end surface 115, first external electrode 120 becomes thicker toward the center from both sides in stacking direction T. On second end surface 116, second external electrode 130 becomes thicker toward the center from both sides in stacking direction T.

As shown in FIGS. 2 and 6, stacked body 110 includes a first outer layer 141, a second outer layer 142, a first outermost internal electrode layer 151, and a second outermost internal electrode layer 152. Each of first and second outer layers 141 and 142 is one of the plurality of dielectric layers 140. Each of first and second outermost internal electrode layers 151 and 152 is one of the plurality of internal electrode layers 150.

First outer layer 141 of the plurality of dielectric layers 140 defines first main surface 111. First outermost internal electrode layer 151 of the plurality of internal electrode layers 150 is adjacent to first outer layer 141. First outermost internal electrode layer 151 is in contact with first external electrode 120 at first end surface 115.

First outermost internal electrode layer 151 is curved away from first main surface 111 as it gets closer to first end surface 115. In the present preferred embodiment, ridge lines 117 at first main surface 111 have a relatively angular shape. Accordingly, thickness TE1 of first outer layer 141 at first end surface 115 is greater than thickness TC1 of first outer layer 141 at the center or approximate center in length direction L.

Ridge lines 117 at first main surface 111 may be rounded and curved as long as thickness TE1 of first outer layer 141 at first end surface 115 is greater than thickness TC1 of first outer layer 141 at the center in length direction L. In the present preferred embodiment, at the center or approximate center in width direction W, the curvature radius of each of the plurality of ridge lines 117 of stacked body 110 is preferably not less than about 5 μm and not more than about 25 μm, for example. If ridge lines 117 are rounded and curved, thickness TE1 of first outer layer 141 at first end surface 115 is determined as a distance from the end, on the first end surface 115 side, of the curved surface which defines ridge line 117, to first outermost internal electrode layer 151 at first end surface 115.

Specifically, in the present preferred embodiment, thickness TE1 of first outer layer 141 at first end surface 115 is preferably, for example, more than about 1.5 times greater than thickness TC1 of first outer layer 141 at the center or approximate center in length direction L.

As shown in FIGS. 2 and 3, in the present preferred embodiment, at the center or approximate center in width direction W, thickness LA1 in length direction L of a portion of first external electrode 120 that is in contact with first outermost internal electrode layer 151 is greater than thickness LB1 in length direction L of a portion of first external electrode 120 that is in contact with first main surface 111. Specifically, thickness LA1 in length direction L of a portion of first external electrode 120 that is in contact with first outermost internal electrode layer 151 is not less than 4 μm.

As shown in FIG. 2, second outer layer 142 of the plurality of dielectric layers 140 defines second main surface 112. Second outermost internal electrode layer 152 of the plurality of internal electrode layers 150 is adjacent to second outer layer 142. Second outermost internal electrode layer 152 is in contact with second external electrode 130 at second end surface 116.

Second outermost internal electrode layer 152 is curved away from second main surface 112 as it gets closer to second end surface 116. In the present preferred embodiment, ridge lines 117 at second main surface 112 have a relatively angular shape. Accordingly, thickness TE2 of second outer layer 142 at second end surface 116 is greater than thickness TC2 of second outer layer 142 at the center in length direction L.

Ridge lines 117 at second main surface 112 may be rounded and curved as long as thickness TE2 of second outer layer 142 at second end surface 116 is greater than thickness TC2 of second outer layer 142 at the center in length direction L. If ridge lines 117 are rounded and curved, thickness TE2 of second outer layer 142 at second end surface 116 is determined as a distance from the end, on the second end surface 116 side, of the curved surface which defines ridge line 117, to second outermost internal electrode layer 152 at second end surface 116.

Specifically, in the present preferred embodiment, thickness TE2 of second outer layer 142 at second end surface 116 is preferably, for example, more than 1.5 times greater than thickness TC2 of second outer layer 142 at the center or approximate center in length direction L.

As shown in FIGS. 2 and 4, in the present preferred embodiment, at the center or approximate center in width direction W, thickness LA2 in length direction L of a portion of second external electrode 130 that is in contact with second outermost internal electrode layer 152 is greater than thickness LB2 in length direction L of a portion of second external electrode 130 that is in contact with second main surface 112. Specifically, thickness LA2 in length direction L of a portion of second external electrode 130 that is in contact with second outermost internal electrode layer 152 is preferably not less than about 4 μm, for example.

Each of the plurality of dielectric layers 140 located between first and second outermost internal electrode layers 151 and 152 preferably has a thickness of not less than about 0.4 μm and not more than about 5 μm, and more preferably not less than about 0.4 μm and not more than about 2 μm, for example.

Dielectric layers 140 are preferably made of a perovskite compound including Ba or Ti, for example. As a material of dielectric layers 140, dielectric ceramic may preferably be used that includes, for example, $BaTiO_3$, $CaTiO_3$, $SrTiO_3$, or $CaZrO_3$ as a primary component. To any of these primary components, a secondary component may be added, examples of which may include material including Mn compound, Mg compound, Si compound, Fe compound, Cr compounds, Co compound, Ni compound, Al compound, V compound, or rare-earth compound. The material of dielectric layers 140 preferably has a relative permittivity of about 1000 or more, for example.

Each of the plurality of internal electrode layers 150 preferably has a thickness of not less than about 0.3 μm and not more than about 1.0 μm, for example. The percentage of area at which each of the plurality of internal electrode layers 150 continuously covers dielectric layer 140 is preferably not less than about 50% and not more than about 95%, for example.

Internal electrode layers 150 may preferably be made of, for example, one selected from the group consisting of Ni, Cu, Ag, Pd, and Au; or an alloy including any of these metals (e.g., Ag—Pd alloy). Internal electrode layers 150 may include dielectric particles having the same or substantially the same composition as the dielectric ceramic included in dielectric layers 140.

As shown in FIGS. 2 and 5, each of first and second external electrodes 120 and 130 includes an underlying electrode layer 160 and a plating layer 170. Underlying electrode layer 160 preferably includes at least one of a baked layer, a resin layer, and a thin-film layer, for example. In the present preferred embodiment, underlying electrode layer 160 is made of a baked layer. Underlying electrode layer 160 preferably has a thickness of, for example, not less than about 10 μm and not more than about 50 μm, more preferably not more than about 25 µm, further more preferably not more than about 15 µm, at the center or approximate center in width direction W and at the center or approximate center in stacking direction T.

The baked layer includes glass and metal. The metal in the baked layer may preferably be, for example, one selected from the group consisting of Ni, Cu, Ag, Pd, and Au; or an alloy including any of these metals (e.g., Ag—Pd alloy). The glass preferably includes Si and Zn, for example. The baked layer may include a plurality of stacked layers. The baked layer may be formed by applying conductive paste to stacked body 110 and then baking it, or firing at the same time as internal electrode layers 150.

As shown in FIG. 5, in the present preferred embodiment, underlying electrode layer 160 is not formed on each of the plurality of corners 118. That is, each of the plurality of corners 118 is exposed through underlying electrode layer 160.

Plating layer 170 is disposed on underlying electrode layer 160. The plating layer may preferably be made of, for example, one selected from the group consisting of Ni (nickel), Cu (copper), Ag (silver), Pd (palladium), and Au (gold); or an alloy including any of these metals (e.g., Ag—Pd alloy).

In the present preferred embodiment, plating layer 170 includes a nickel layer located on the underlying electrode layer 160 side, and a tin layer located opposite to the underlying electrode layer 160 side. Specifically, plating layer 170 has a double-layer structure in which the tin plating layer is provided on the nickel plating layer.

The nickel layer preferably has an average thickness of not less than about 0.5 µm and not more than about 10 µm, more preferably not more than about 4.5 µm, and further more preferably not more than about 3.7 µm, for example. The tin layer preferably has an average thickness of not less than about 0.5 µm and not more than about 10 µm, more preferably not more than about 4.5 µm, and further more preferably not more than about 3.7 µm, for example.

As shown in FIG. 5, in the present preferred embodiment, each of the plurality of corners 118 of stacked body 110 is exposed through underlying electrode layer 160 and is thus directly covered with plating layer 170.

Multilayer ceramic electronic component 100 in the present preferred embodiment is particularly a multilayer ceramic capacitor, for example. In the present preferred embodiment, multilayer ceramic electronic component 100 has dimensions of, for example, not more than about 3.2 mm in length direction L, not more than about 2.5 mm in width direction W, and not more than about 2.5 mm in stacking direction T.

A non-limiting example of a method for manufacturing multilayer ceramic electronic component 100 according to a preferred embodiment of the present invention will now be described. In the following method for manufacturing multilayer ceramic electronic component 100, partway through the manufacturing process, collective processing is performed to produce a mother stacked body. Then, the mother stacked body is cut into soft stacked body pieces, each of which is then further processed. Thus, a plurality of multilayer ceramic electronic components 100 are manufactured in large quantity at the same time.

Figure 7:
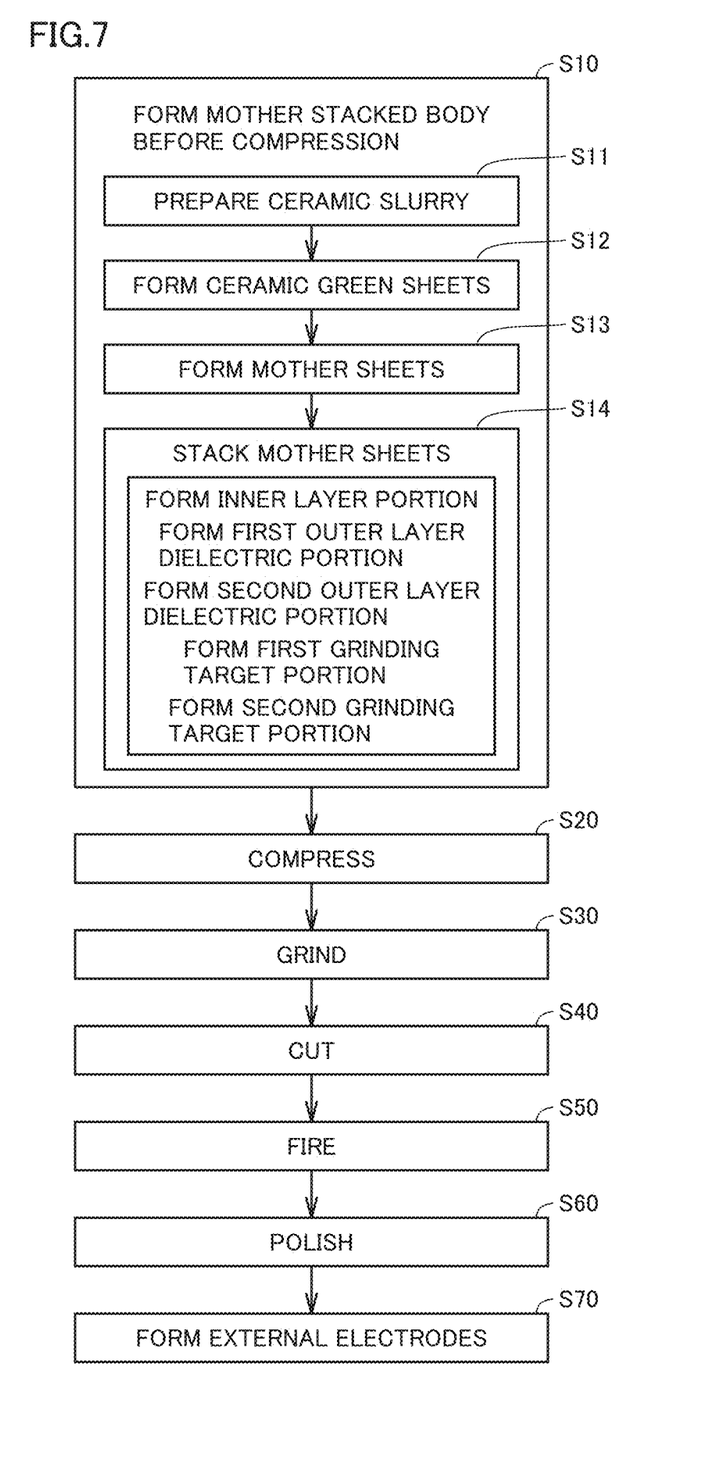
FIG. 7 is a flowchart showing a method for manufacturing a multilayer ceramic electronic component according to a preferred embodiment of the present invention.

FIG. 7 is a flowchart showing a non-limiting example of a method for manufacturing a multilayer ceramic electronic component according to a preferred embodiment of the present invention. As shown in FIG. 7, the method for manufacturing multilayer ceramic electronic component 100 according to the present preferred embodiment includes a step S10 of forming a mother stacked body 210 before compression, a step S20 of compressing, a step S30 of grinding, a step S40 of cutting, a step S50 of firing, a step S60 of polishing, and a step S70 of external electrode formation.

As shown in FIG. 7, in step S10 of forming mother stacked body 210 before compression, first, a ceramic slurry is prepared (S11). Specifically, ceramic powder, binder, resin, solvent, etc., for example, are mixed at a predetermined combination ratio, thus forming a ceramic slurry.

Next, ceramic green sheets are formed (S12). Specifically, the ceramic slurry is shaped into sheets on a carrier film using, for example, a die coater, a gravure coater, or a micro gravure coater, thus forming ceramic green sheets.

Next, mother sheets are formed (S13). Specifically, the ceramic green sheets are printed with conductive paste in a predetermined pattern by, for example, screen printing or gravure printing, thereby forming mother sheets, which are the ceramic green sheets having a predetermined conductive pattern formed thereon.

As the mother sheets, not only the mother sheets with a conductive pattern formed thereon, but also ceramic green sheets with no conductive pattern are prepared.

Figure 8:
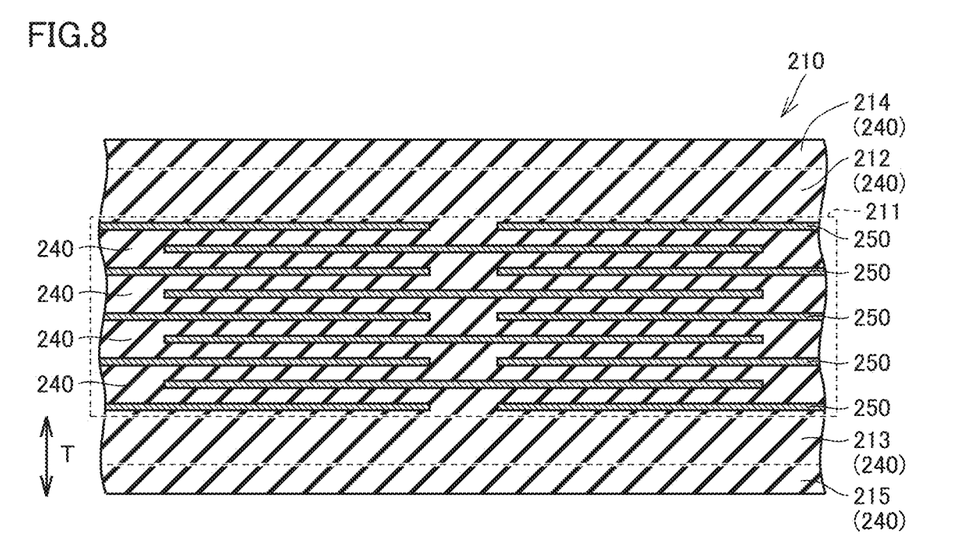
FIG. 8 is a cross-sectional view showing a mother stacked body before compression, taken along a length direction L of the multilayer ceramic electronic component.

Next, the mother sheets are stacked (S14). Thus, a mother stacked body before compression is formed. FIG. 8 is a cross-sectional view showing a mother stacked body before compression, taken along a length direction L of the multilayer ceramic electronic component.

As shown in FIGS. 7 and 8, step S10 of forming mother stacked body 210 before compression includes a step of forming an inner layer portion 211, a step of forming a first outer layer dielectric portion 212, a step of forming a second outer layer dielectric portion 213, a step of forming a first grinding target portion 214, and a step of forming a second grinding target portion 215, by stacking the mother sheets (S14).

In the step of forming inner layer portion 211, a plurality of dielectric sheets 240 having internal-electrode conductive paste 250 applied thereto are stacked. Specifically, a plurality of mother sheets having a conductive pattern formed thereon with internal-electrode conductive paste 250 are stacked in sequence.

In the step of forming first outer layer dielectric portion 212, a plurality of dielectric sheets 240 are further stacked on one side in stacking direction T of inner layer portion 211. Specifically, a plurality of mother sheets with no conductive pattern are stacked in sequence.

In the step of forming second outer layer dielectric portion 213, a plurality of dielectric sheets 240 are further stacked on the other side in stacking direction T of inner layer portion 211. Specifically, a plurality of mother sheets with no conductive pattern are stacked in sequence.

In the step of forming first grinding target portion 214, a plurality of dielectric sheets 240 are further stacked on one side in stacking direction T of first outer layer dielectric portion 212. Specifically, a plurality of mother sheets with no conductive pattern are stacked in sequence.

In the step of forming second grinding target portion 215, a plurality of dielectric sheets 240 are further stacked on the other side in stacking direction T of second outer layer dielectric portion 213. Specifically, a plurality of mother sheets with no conductive pattern are stacked in sequence.

The step of forming inner layer portion 211, the step of forming first outer layer dielectric portion 212, the step of forming second outer layer dielectric portion 213, the step of forming first grinding target portion 214, and the step of forming second grinding target portion 215 may be performed in any order. For example, the portions may be formed in the following order: first grinding target portion 214, first outer layer dielectric portion 212, inner layer portion 211, second outer layer dielectric portion 213, and second grinding target portion 215.

In the present preferred embodiment, in step S10 of forming mother stacked body 210 before compression, the material of dielectric sheets 240 defining first and second grinding target portions 214 and 215 has a higher hardness than the material of dielectric sheets 240 defining first and second outer layer dielectric portions 212 and 213. The hardness of the material of dielectric sheets 240 can be set appropriately by changing the amount of resin content or the type of binder in dielectric sheets 240. Specifically, the hardness of the material of dielectric sheets 240, i.e., the hardness of the mother sheets, can be set by appropriately changing the amount of resin content or the type of binder in the ceramic slurry. In step S10 of forming mother stacked body 210 before compression, the material of dielectric sheets 240 defining first and second grinding target portions 214 and 215 may be the same or substantially the same as the material of dielectric sheets 240 defining first and second outer layer dielectric portions 212 and 213.

Figure 9:
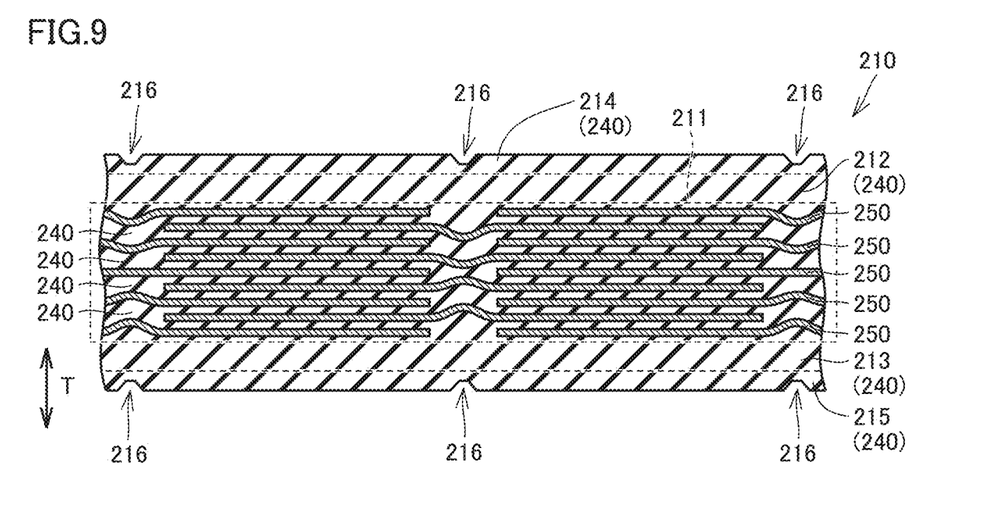
FIG. 9 is a cross-sectional view showing the mother stacked body after compression, taken along a length direction L of the multilayer ceramic electronic component.

FIG. 9 is a cross-sectional view showing the mother stacked body after compression, taken along a length direction L of the multilayer ceramic electronic component.

As shown in FIGS. 7 and 9, in step S20 of compressing, mother stacked body 210 is pressed along stacking direction T. This compresses together the mother sheets defining inner layer portion 211, first outer layer dielectric portion 212, second outer layer dielectric portion 213, first grinding target portion 214, and second grinding target portion 215, which define mother stacked body 210; and also compresses together these portions defining mother stacked body 210. In the present preferred embodiment, the compression of mother stacked body 210 is performed by hydrostatic pressing, for example.

As shown in FIG. 8, inner layer portion 211 of mother stacked body 210 includes a dense area, where internal-electrode conductive paste layers 250 are dense, and a sparse area, where internal-electrode conductive paste layers 250 are sparse. The sparse area where internal-electrode conductive paste layers 250 are sparse corresponds to first and second end surfaces 115 and 116 of stacked body 110. In mother stacked body 210 before compression, internal-electrode conductive paste layers 250 have less compressibility than dielectric sheets 240 when compressed. Accordingly, when mother stacked body 210 is compressed by hydrostatic pressing, for example, the sparse area where internal-electrode conductive paste layers 250 are sparse has higher compressibility than the dense area where internal-electrode conductive paste layers 250 are dense. This causes a plurality of grooves 216 to be formed in first and second grinding target portions 214 and 215 of mother stacked body 210 after compression at the locations corresponding to the sparse areas, as shown in FIG. 9. In the sparse area of mother stacked body 210 after compression, internal-electrode conductive paste layers 250 are curved toward the center in stacking direction T.

In the present preferred embodiment, the thickness in stacking direction T of each of first and second grinding target portions 214 and 215 after compression is preferably adjusted to, for example, not less than about 1% and not more than about 10% of the thickness in stacking direction T of mother stacked body 210 after compression.

Figure 10:
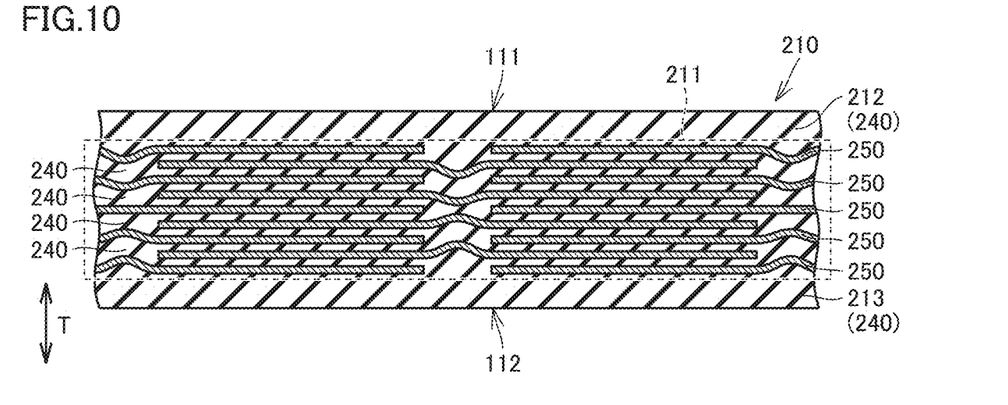
FIG. 10 is a cross-sectional view showing the mother stacked body partially ground after compression, taken along a length direction L of the multilayer ceramic electronic component.

FIG. 10 is a cross-sectional view showing the mother stacked body partially ground after compression, taken along a length direction L of the multilayer ceramic electronic component.

As shown in FIGS. 7, 9, and 10, in step S30 of grinding, first and second grinding target portions 214 and 215 located on both sides of compressed mother stacked body 210 in the stacking direction are ground, thus forming planar first main surface 111 and planar second main surface 112. Specifically, in step S20 of compressing before step S30 of grinding, first and second grinding target portions 214 and 215 are formed such that the depth of the plurality of grooves 216 formed in first and second grinding target portions 214 and 215 is smaller than the thickness of first and second grinding target portions 214 and 215 in mother stacked body 210 after compression.

Any of known methods may be used to grind first and second grinding target portions 214 and 215, such as, for example, using a surface grinder.

Figure 11:
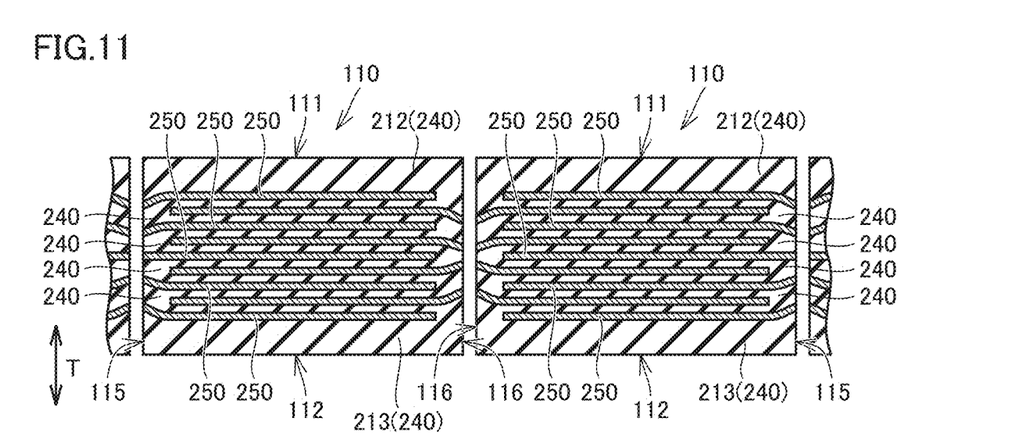
FIG. 11 is a cross-sectional view showing a plurality of stacked bodies into which the compressed and ground mother stacked body is cut, taken along a length direction L of the multilayer ceramic electronic component.

FIG. 11 is a cross-sectional view showing a plurality of stacked bodies into which the compressed and ground mother stacked body is cut, taken along a length direction L of the multilayer ceramic electronic component.

As shown in FIGS. 7, 10, and 11, in step S40 of cutting, stacked bodies 110 are cut out of mother stacked body 210 including first main surface 111 and second main surface 112 opposite to first main surface 111 in stacking direction T. Specifically, mother stacked body 210 is cut into a plurality of pieces of soft stacked bodies 110 in a matrix by push-cutting or dicing, for example. In the present preferred embodiment, mother stacked body 210 is cut at the locations at which internal-electrode conductive paste layers 250 are curved toward the center in the stacking direction, so that first and second end surfaces 115 and 116 are formed.

As shown in FIG. 7, in step S50 of firing, soft stacked body 110 described above is fired. Specifically, the soft stacked body is heated to a predetermined temperature, thus firing the dielectric ceramic material. The firing temperature is set appropriately in accordance with the type of material of the dielectric ceramic, e.g., within a range of not less than about 900° C. and not more than about 1300° C.

Next, as shown in FIG. 7, in step S60 of polishing, a plurality of corners 118 and ridge lines 117 of stacked body 110 are polished. Specifically, stacked body 110 is enclosed in a container, called a barrel, together with medium balls having a higher hardness than the ceramic material. The barrel is rotated to polish stacked body 110 to an extent that ridge lines 117 of stacked body 110 will have a predetermined curvature radius while corners 118 and ridge lines 117 of stacked body 110 still have an angular shape.

Step S60 of polishing may be performed prior to step S50 of firing. In this case, in step S60 of polishing, soft stacked body 110 is enclosed in a barrel together with the medium balls and the barrel is rotated, so that stacked body 110 is polished to an extent that ridge lines 117 have a predetermined curvature radius.

Next, as shown in FIGS. 1, 2, and 7, in step S70 of external electrode formation, first and second external electrodes 120 and 130 are formed. First external electrode 120 is formed so that it covers first end surface 115 and continuously extends from first end surface 115 to each of first main surface 111, second main surface 112, first lateral surface 113, and second lateral surface 114. Second external electrode 130 is formed so that it covers second end surface 116 and continuously extends from second end surface 116 to each of first main surface 111, second main surface 112, first lateral surface 113, and second lateral surface 114.

In the present preferred embodiment, first, underlying electrode layer 160 for each of first and second external electrodes 120 and 130 is formed by dipping. At this time, stacked body 110 is immersed in conductive paste while stacked body 110 is placed with its length direction L being along the gravity direction, i.e., with first end surface 115 or second end surface 116 facing downward. Since the conductive paste is applied in such a way in the present preferred embodiment, the gravity causes the conductive paste applied at and around ridge lines 117 to flow toward the center of first end surface 115 or second end surface 116, as shown in FIG. 2. Also, the surface tension causes the conductive paste to gather on first main surface 111, second main surface 112, first lateral surface 113, and second lateral surface 114. Underlying electrode layer 160 being formed in such a way, portions of underlying electrode layer 160 and first external electrode 120 that are around the plurality of ridge lines 117 are relatively thin. Further, as shown in FIG. 3, in the present preferred embodiment, underlying electrode layer 160 does not adhere to each of the plurality of corners 118 for the reasons described above.

After that, the conductive paste applied to mother stacked body 210 is baked. The conductive paste includes organic solvent, metallic particles, and glass. In the present preferred embodiment, the baking temperature is preferably about 840° C., for example.

Next, as shown in FIG. 2, plating layer 170 is formed by plating so that it covers underlying electrode layer 160. The formation of plating layer 170 finishes first and second external electrodes 120 and 130. As shown in FIG. 3, at the plurality of corners 118, stacked body 110 is directly covered with plating layer 170. Plating layer 170 covering underlying electrode layer 160 extends to cover the plurality of corners 118.

Through a series of steps described above, multilayer ceramic electronic component 100 shown in FIGS. 1 to 6 is manufactured.

Figure 12:
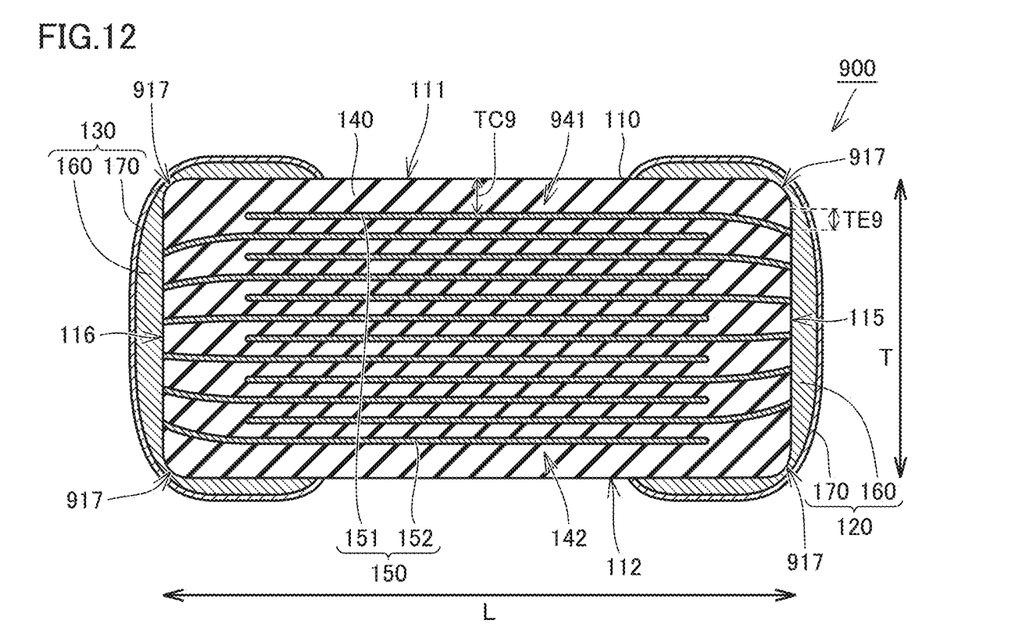
FIG. 12 is a cross-sectional view showing a configuration of a multilayer ceramic electronic component in a comparative example.

A multilayer ceramic electronic component in a comparative example will now be described. FIG. 12 is a cross-sectional view showing a configuration of a multilayer ceramic electronic component in a comparative example. FIG. 12 shows a cross section taken at the same position as FIG. 2.

As shown in FIG. 12, a multilayer ceramic electronic component 900 in the comparative example includes rounded ridge lines 917 with a relatively large curvature radius. Thickness TE9 of first outer layer 941 at first end surface 115 is smaller than thickness TC9 of first outer layer 941 at the center in length direction L. Accordingly, a thinner portion of first external electrode 120 located on ridge line 917 is close to a portion of first outermost internal electrode layer 151 that is in contact with first external electrode 120 at first end surface 115. This causes water outside multilayer ceramic electronic component 900 to easily enter first outermost internal electrode layer 151 through the thinner portion of first external electrode 120 on ridge line 917.

On the other hand, in multilayer ceramic electronic component 100 according to the above-described preferred embodiment of the present invention, as shown in FIG. 2, thickness TE1 of first outer layer 141 at first end surface 115 is greater than thickness TC1 of first outer layer 141 at the center or approximate center in length direction L. Accordingly, a thinner portion of first external electrode 120 located on ridge line 117 is relatively remote from a portion of first outermost internal electrode layer 151 that is in contact with first external electrode 120 at first end surface 115. This reduces or prevents water outside multilayer ceramic electronic component 100 from entering first outermost internal electrode layer 151 through the thinner portion of first external electrode 120. Thus, in the present preferred embodiment, multilayer ceramic electronic component 100 has an improved resistance to moisture.

An experimental example will now be described in which the resistance to moisture of multilayer ceramic electronic component 100 according to the above-described preferred embodiment of the present invention was evaluated by a pressure cooker bias test (PCBT). The multilayer ceramic electronic components in the working examples used in this experimental example are different from one another in curvature radius of ridge lines 117, thickness LA1 in length direction L of a portion of first external electrode 120 that is in contact with first outermost internal electrode layer 151, or thickness LA2 in length direction L of a portion of second external electrode 130 that is in contact with second outermost internal electrode layer 152.

The multilayer ceramic electronic components in the working examples used in this experimental example have dimensions of about 0.6 mm in length direction L, about 0.3 mm in width direction W, and about 0.3 mm in stacking direction T. In other respects, the multilayer ceramic electronic components in the working examples used in this experimental example are the same or substantially the same as multilayer ceramic electronic component 100 according to the above-described preferred embodiment of the present invention in their configuration and manufacturing method.

In the PCBT, first, the multilayer ceramic electronic components in the working examples were each mounted on a predetermined substrate. The mounted multilayer ceramic electronic components were placed in a chamber under an atmosphere with about 125° C. and a relative humidity of about 95% RH. For each multilayer ceramic electronic component placed in the chamber, a direct-current voltage of about 1 V was continuously applied between first external electrode 120 and second external electrode 130 for about 72 hours. With respect to the multilayer ceramic electronic components thus treated, the insulation resistance was measured. Multilayer ceramic electronic components having an insulation resistance of equal to or less than about $50 \times 10^6 \Omega$ were determined to be "poor".

The results of the PCBT are shown in table 1 below. Table 1 shows the number of samples that were determined to be "poor", from among 100 samples tested for each working example.

TABLE 1

| | Curvature radius of ridge lines [μm] | LA1 and LA2 [μm] | Number of "poor" |
|---|---|---|---|
| Working example 1 | 5 | 7 | 0 |
| Working example 2 | 10 | 7 | 0 |
| Working example 3 | 15 | 7 | 0 |
| Working example 4 | 20 | 7 | 0 |
| Working example 5 | 25 | 7 | 0 |
| Working example 6 | 30 | 7 | 3 |
| Working example 7 | 40 | 7 | 2 |
| Working example 8 | 5 | 3 | 1 |

TABLE 1-continued

| | Curvature radius of ridge lines [μm] | LA1 and LA2 [μm] | Number of "poor" |
|---|---|---|---|
| Working example 9 | 5 | 4 | 0 |
| Working example 10 | 5 | 6 | 0 |
| Working example 11 | 5 | 10 | 0 |
| Working example 12 | 25 | 3 | 2 |
| Working example 13 | 25 | 4 | 0 |
| Working example 14 | 25 | 6 | 0 |
| Working example 15 | 25 | 10 | 0 |

Table 1 shows that the multilayer ceramic electronic components in working examples 1 to 5, 9 to 11, and 13 to 15, in which the curvature radius of ridge lines is not less than about 5 μm and not more than about 25 μm and thicknesses LA1 and LA2 are not less than about 4 μm, have a smaller number of "poor", as compared to working examples 6 and 7 in which the curvature radius of ridge lines is more than about 25 μm, and working examples 8 and 12 in which thicknesses LA1 and LA2 are less than about 4 μm. This confirms that, in multilayer ceramic electronic component 100 according to the above-described preferred embodiment of the present invention, the curvature radius of ridge lines is preferably not less than about 5 μm and not more than about 25 μm, thickness LA1 in length direction L of a portion of first external electrode 120 that is in contact with first outermost internal electrode layer 151 at the center or approximate center in width direction W is preferably not less than about 4 μm, and thickness LA2 in length direction L of a portion of second external electrode 130 that is in contact with second outermost internal electrode layer 152 at the center or approximate center in width direction W is preferably not less than about 4 μm.

As described above, in multilayer ceramic electronic component 100 according to the above-described preferred embodiment of the present invention, stacked body 110 includes first outer layer 141 and first outermost internal electrode layer 151. First outer layer 141 of a plurality of dielectric layers 140 defines first main surface 111. First outermost internal electrode layer 151 of a plurality of internal electrode layers 150 is adjacent to first outer layer 141. First outermost internal electrode layer 151 is in contact with first external electrode 120 at first end surface 115. The thickness of first outer layer 141 at first end surface 115 is greater than the thickness of first outer layer 141 at the center or approximate center in length direction L. Thus, multilayer ceramic electronic component 100 has an improved resistance to moisture.

In the present preferred embodiment, the thickness of first outer layer 141 at first end surface 115 is preferably more than about 1.5 times greater than the thickness of first outer layer 141 at the center or approximate center in length direction L. This allows for a sufficiently long distance from ridge line 117 to first outermost internal electrode layer 151 at first end surface 115, thus more reliably reducing or preventing water from entering the interface of first outermost internal electrode layer 151. This results in further improvement in resistance to moisture of multilayer ceramic electronic component 100.

In the present preferred embodiment, at the center or approximate center in width direction W, the thickness in length direction L of a portion of first external electrode 120 that is in contact with first outermost internal electrode layer 151 is greater than the thickness in length direction L of a portion of first external electrode 120 that is in contact with first main surface 111. Thus, at the center or approximate center in width direction W, the thickness in length direction L of a portion of first external electrode 120 that is in contact with first outermost internal electrode layer 151 is relatively large. This reduces or prevents water from entering the interface of first outermost internal electrode layer 151 through first external electrode 120 in length direction L, thus improving the resistance to moisture of multilayer ceramic electronic component 100.

In the present preferred embodiment, at the center or approximate center in width direction W, the curvature radius of each of the plurality of ridge lines 117 of stacked body 110 is preferably not less than about 5 μm and not more than about 25 μm. The thickness in length direction L of a portion of first external electrode 120 that is in contact with first outermost internal electrode layer 151 is preferably not less than about 4 μm. This allows for an increased thickness of first external electrode 120 while reducing the curvature radius of ridge lines 117. That is, this allows for an increased distance from ridge line 117 to first outermost internal electrode layer 151 at first end surface 115, thereby providing predetermined moisture resistance reliability to multilayer ceramic electronic component 100.

In the present preferred embodiment, stacked body 110 further includes second outer layer 142 and second outermost internal electrode layer 152. Second outer layer 142 of a plurality of dielectric layers 140 defines second main surface 112. Second outermost internal electrode layer 152 of a plurality of internal electrode layers 150 is adjacent to second outer layer 142. Second outermost internal electrode layer 152 is in contact with second external electrode 130 at second end surface 116. The thickness of second outer layer 142 at second end surface 116 is greater than the thickness of second outer layer 142 at the center in length direction L.

Thus, at the center or approximate center in width direction W, the thickness in length direction L of a portion of second external electrode 130 that is in contact with second outermost internal electrode layer 152 is relatively large. This reduces or prevents water from entering the interface of second outermost internal electrode layer 152 through second external electrode 130 in length direction L, thus further improving the resistance to moisture of multilayer ceramic electronic component 100.

In the present preferred embodiment, each of first and second external electrodes 120 and 130 includes underlying electrode layer 160 made of a baked layer. Thus, underlying electrode layer 160 can be formed in a simple way.

In the present preferred embodiment, each of first and second external electrodes 120 and 130 further includes plating layer 170 on underlying electrode layer 160. Plating layer 170 includes a nickel layer located on the underlying electrode layer 160 side, and a tin layer located opposite to the underlying electrode layer 160 side. Thus, in each of first and second external electrodes 120 and 130, the nickel layer reduces or prevents underlying electrode layer 160 from being eroded by solder when multilayer ceramic electronic component 100 is mounted. Further, the tin layer improves the solder wettability when multilayer ceramic electronic component 100 is mounted, thus allowing easy mounting of multilayer ceramic electronic component 100.

In the present preferred embodiment, the plurality of corners 118 of stacked body 110 are directly covered with plating layer 170. Accordingly, the external shapes of the plurality of corners 118 of stacked body 110 are directly reflected in the shapes of first and second external electrodes 120 and 130. Specifically, each of first and second external electrodes 120 and 130 includes protrusions at the locations corresponding to corners 118. The protrusions can prevent multilayer ceramic electronic component 100 from standing up when multilayer ceramic electronic component 100 is mounted on a substrate. This reduces or prevents a "tombstone effect" where one of first and second external electrodes 120 and 130 is detached from the substrate, causing multilayer ceramic electronic component 100 to stand up. Specifically, when multilayer ceramic electronic component 100 is about to move toward the standing-up position, the protrusions receive a force from the substrate in the direction toward restraining the standing-up movement. Thus, the tombstone effect can be reduced or prevented.

The method for manufacturing multilayer ceramic electronic component 100 according to the above-described preferred embodiment of the present invention includes a step of forming mother stacked body 210, a step of compressing, and a step of grinding. The step of forming mother stacked body 210 includes a step of forming first grinding target portion 214. In the step of forming first grinding target portion 214, a plurality of dielectric sheets 240 are further stacked on one side in stacking direction T of first outer layer dielectric portion 212. In the step of compressing, mother stacked body 210 is pressed in stacking direction T. In the step of grinding, first grinding target portion 214 of the compressed mother stacked body 210 is ground to form planar first main surface 111.

In this way, the thickness of first outer layer 141 at first end surface 115 can be greater than the thickness of first outer layer 141 at the center or approximate center in length direction L. This improves the resistance to moisture of multilayer ceramic electronic component 100.

In the step of forming mother stacked body 210, the material of dielectric sheets 240 defining first grinding target portion 214 has a higher hardness than the material of dielectric sheets 240 defining first outer layer dielectric portion 212.

This allows for a relatively high hardness of first grinding target portion 214 after compression, thus preventing ridge lines 117 from being rounded when first grinding target portion 214 is ground. Accordingly, the thickness of first outer layer 141 at first end surface 115 can be relatively large. Thus, multilayer ceramic electronic component 100 can be improved in resistance to moisture.

The step of forming mother stacked body 210 further includes a step of forming a second outer layer dielectric portion and a step of forming a second grinding target portion. In the step of forming the second outer layer dielectric portion, a plurality of dielectric sheets 240 are further stacked on the other side in stacking direction T of inner layer portion 211. In the step of forming the second grinding target portion, a plurality of dielectric sheets 240 are further stacked on the other side in stacking direction T of the second outer layer dielectric portion. In the step of grinding, the second grinding target portion of the compressed mother stacked body 210 is ground to form planar second main surface 112.

In this way, the ridge lines can be prevented from being rounded when second grinding target portion 215 is ground. Accordingly, the thickness of second outer layer 142 at second end surface 116 can be relatively large. Thus, multilayer ceramic electronic component 100 can be improved in resistance to moisture. Some of the features in the above-described preferred embodiments may be combined where possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a stacked body including a plurality of dielectric layers and a plurality of internal electrode layers alternately stacked along a stacking direction, the stacked body including:
a first main surface and a second main surface opposite to each other in the stacking direction;
a first lateral surface and a second lateral surface opposite to each other in a width direction orthogonal or substantially orthogonal to the stacking direction; and
a first end surface and a second end surface opposite to each other in a length direction orthogonal or substantially orthogonal to both the stacking direction and the width direction;
a first external electrode covering the first end surface and continuously extending from the first end surface to each of the first main surface, the second main surface, the first lateral surface, and the second lateral surface; and
a second external electrode covering the second end surface and continuously extending from the second end surface to each of the first main surface, the second main surface, the first lateral surface, and the second lateral surface; wherein
the stacked body includes:
a first outer layer of the plurality of dielectric layers, the first outer layer defining the first main surface; and
a first outermost internal electrode layer of the plurality of internal electrode layers, the first outermost internal electrode layer being adjacent to the first outer layer;
the first outermost internal electrode layer is increasingly curved away from the first main surface as the first outermost internal electrode layer gets closer to the first end surface;
the first outermost internal electrode layer is in contact with the first external electrode at the first end surface; and
a thickness of the first outer layer at the first end surface is greater than a thickness of the first outer layer at a center or an approximate center in the length direction.

2. The multilayer ceramic electronic component according to claim 1, wherein the thickness of the first outer layer at the first end surface is more than about 1.5 times greater than the thickness of the first outer layer at the center or the approximate center in the length direction.

3. The multilayer ceramic electronic component according to claim 1, wherein, at a center or an approximate center in the width direction, a thickness in the length direction of a portion of the first external electrode that is in contact with the first outermost internal electrode layer is greater than a thickness in the length direction of a portion of the first external electrode that is in contact with the first main surface.

4. The multilayer ceramic electronic component according to claim 3, wherein, at the center or the approximate center in the width direction, a curvature radius of each of a plurality of ridge lines of the stacked body is not less than about 5 μm and not more than about 25 μm, and the thickness in the length direction of the portion of the first external electrode that is in contact with the first outermost internal electrode layer is not less than about 4 μm.

5. The multilayer ceramic electronic component according to claim 1, wherein
the stacked body further includes:
a second outer layer of the plurality of dielectric layers, the second outer layer defining the second main surface; and
a second outermost internal electrode layer of the plurality of internal electrode layers, the second outermost internal electrode layer being adjacent to the second outer layer;
the second outermost internal electrode layer is in contact with the second external electrode at the second end surface; and
a thickness of the second outer layer at the second end surface is greater than a thickness of the second outer layer at the center in the length direction.

6. The multilayer ceramic electronic component according to claim 1, wherein each of the first external electrode and the second external electrode includes an underlying electrode layer made of a baked layer.

7. The multilayer ceramic electronic component according to claim 6, wherein
each of the first external electrode and the second external electrode further includes a plating layer on the underlying electrode layer; and
the plating layer includes:
a nickel layer located on an underlying electrode layer side; and
a tin layer located opposite to the underlying electrode layer side.

8. The multilayer ceramic electronic component according to claim 7, wherein the stacked body includes a plurality of corners directly covered with the plating layer.

9. The multilayer ceramic electronic component according to claim 1, wherein the stacked body has a rectangular or substantially rectangular parallelepiped external shape.

10. The multilayer ceramic electronic component according to claim 1, wherein each of the plurality of dielectric layers has a thickness of not less than about 0.4 μm and not more than about 5 μm.

11. The multilayer ceramic electronic component according to claim 1, wherein each of the plurality of dielectric layers has a thickness of not less than about 0.4 μm and not more than about 2 μm.

12. The multilayer ceramic electronic component according to claim 1, wherein each of the plurality of internal electrode layers has a thickness of not less than about 0.3 μm and not more than about 1.0 μm.

13. The multilayer ceramic electronic component according to claim 1, wherein a percentage of area at which each of the plurality of internal electrode layers continuously covers a respective one of the plurality of dielectric layers is not less than about 50% and not more than about 95%.

14. The multilayer ceramic electronic component according to claim 6, wherein a thickness of the underlying electrode layer is not less than about 10 μm and not more than about 50 μm.

* * * * *